Nov. 13, 1934.   W. CHRISTIE   1,980,849
DUAL WHEEL
Original Filed April 30, 1928
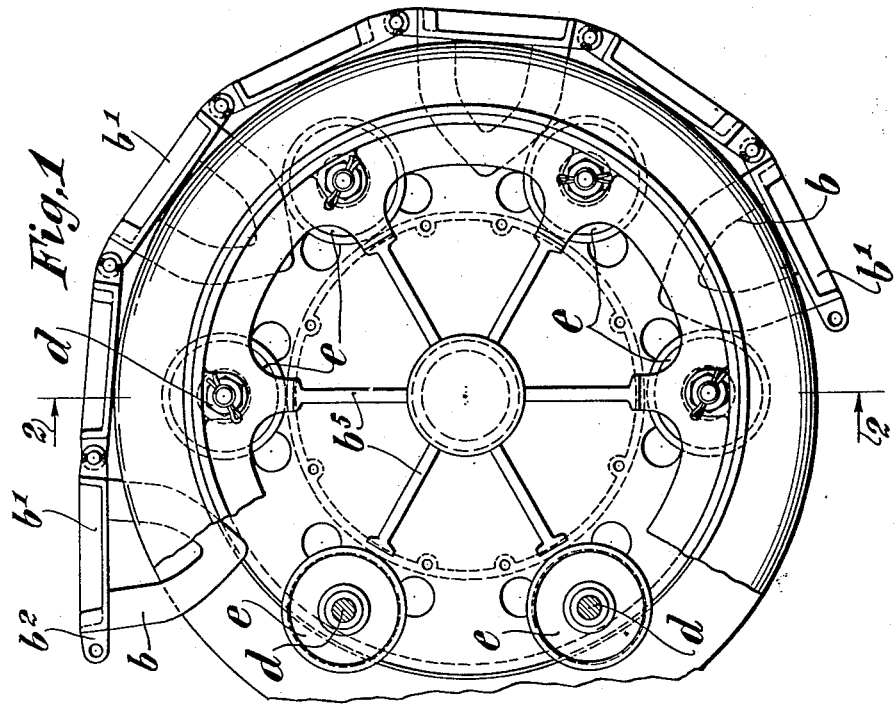
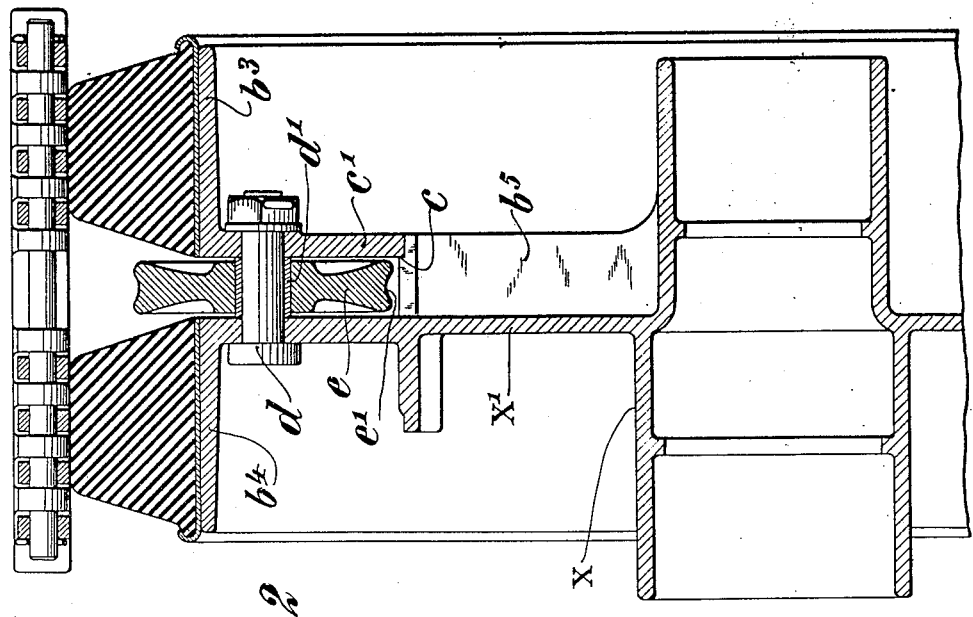
INVENTOR
Walter Christie,
BY Redding, Greeley, O'Shea & Campbell
HIS ATTORNEYS Patented Nov. 13, 1934

1,980,849

UNITED STATES PATENT OFFICE 1,980,849

DUAL WHEEL

Walter Christie, East Orange, N. J., assignor to Charles R. Lord and Clayton Farris, both of Newark, N. J.

Original application April 30, 1928, Serial No. 274,097. Divided and this application May 6, 1932, Serial No. 609,573

2 Claims. (Cl. 74—241)

The present invention relates to improvements in so-called "crawler" attachments for road vehicles of the general type disclosed in applicant's copending applications Ser. No. 688,638 filed February 26, 1924; and Ser. No. 274,097 filed April 30, 1928, now Patent No. 1,856,068, (of which last named application the present is a division). More particularly, the invention embodies an improved form of wheel for mounting dual tires, the wheel being so constructed that an endless track may be mounted thereupon with facility, the drive between the wheel and track being effectively transmitted.

In this connection, the wheels are formed with rollers which are engaged by inwardly projecting lugs upon an endless track, the wheel being constructed in an improved fashion.

An object of the invention, accordingly, is to provide an improved vehicle wheel formed with rollers which are adapted to be engaged by initial projecting lugs formed upon an endless track.

A further object of the invention is to provide a wheel having an improved felly construction wherein rollers are mounted to facilitate the transmission of driving forces between the wheel and track.

Further objects, not specifically enumerated above, will be apparent as the invention is described in greater detail in connection with the accompanying drawing, wherein:

Figure 1 is a view in side elevation, showing a wheel constructed in accordance with the present invention and cooperating with an endless track formed with inwardly projecting lugs.

Figure 2 is a view in section, taken on line 2—2 of Figure 1 and looking in the direction of the arrows.

In accordance with the present invention, wheels of a dual character are provided to cooperate with a track $b^2$ having links $b'$ from which inwardly projecting lugs $b$ extend. The lugs $b$ may be formed with any desired outline to facilitate their engagement with the rollers described hereinafter.

The dual wheel constructed in accordance with the present invention and shown in the drawing comprises a hub $x$ having a spider $x'$ upon which spokes $b^5$ are formed. The spider $x'$ is formed with a felly $b^4$ upon which a tire is adapted to be mounted in any desired fashion. Upon the ends of spokes $b^5$ and engaging a shouldered portion $c$, an annular felly supporting member $c'$ is mounted, the member being formed with a felly $b^3$ to receive a tire in a similar fashion to the felly $b^4$. Felly supporting member $c'$ is secured to the spider $x'$ by means of a series of bolts $d$ and spacers $d'$. Rollers $e$ are journaled upon the spacers and are thus received between the felly supporting members $c'$ and spider $x'$, the spokes $b^5$ forming an annular recess in which the wheels $e$ are journaled.

The rollers $e$ are formed with concave peripheries $e'$ which are adapted to engage the driving edge of the lugs $b$. The driving edges of the lugs are convex in form and thus insure a very satisfactory interaction with the peripheries of the rollers. In this connection, however, it will be seen that this specific formation of the edges of the rollers and lugs may be varied without departing from the scope of the present invention. Since the rollers are rotatable, the forces between the track and wheel are transmitted through rolling friction with the attendant mechanical advantages thereof. The wheel construction is such as to insure free scavaging thereof since the space between the rollers is open and constant rotation of the rollers will serve to discharge any material which tends to collect adjacent thereto.

While the invention has been described with specific reference to the accompanying drawing, it is not to be limited, save as defined in the appended claims.

I claim as my invention:

1. A wheel adapted for use with an endless track adapted to pass around the wheel and provided with driving lugs, said wheel comprising a hub, spokes, a plurality of fellies, said fellies being laterally spaced to provide an annular recess for receiving the driving lugs and one of said fellies being detachable from the wheel, said detachable felly having an inwardly extending portion and said spokes having portions affording seats for the latter, means for rigidly connecting said fellies in spaced relation, and rollers carried by said connecting means and disposed in the recess between the fellies for cooperating with said driving lugs.

2. A wheel adapted for use with an endless track adapted to pass around the wheel and provided with driving lugs, said wheel comprising a hub, a spoke portion, a plurality of fellies respectively provided with inwardly extending plate portions, said fellies being laterally spaced to provide an annular recess for receiving the driving lugs, one of said fellies being detachable from the wheel to permit assembly and disassembly of the endless track therewith and the plate portion of the other felly being integral with said spoke portion, shoulders formed on said spoke portion affording seats for the plate portion of the detachable felly, means connecting said fellies passing through the plate portions thereof, and rollers carried by said means and interposed between said plate portions for cooperating with said driving lugs.

WALTER CHRISTIE.

CERTIFICATE OF CORRECTION.

Patent No. 1,980,849.  November 13, 1934.

WALTER CHRISTIE.

It is hereby certified that error appears in the printed specification of the above numbered patent requiring correction as follows: Lines 107 and 108, claim 2, strike out the words "to permit assembly and disassembly of the endless track therewith"; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.